US012317042B2

(12) United States Patent
Kawashima et al.

(10) Patent No.: US 12,317,042 B2
(45) Date of Patent: May 27, 2025

(54) SUB CONE AND LOUDSPEAKER

(71) Applicant: Panasonic Intellectual Property Management Co., Ltd., Osaka (JP)

(72) Inventors: Yoshitaka Kawashima, Shiga (JP); Yuki Ishii, Kanagawa (JP); Yuuki Izumi, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 268 days.

(21) Appl. No.: 18/133,772

(22) Filed: Apr. 12, 2023

(65) Prior Publication Data

US 2023/0345179 A1 Oct. 26, 2023

(30) Foreign Application Priority Data

Apr. 26, 2022 (JP) ................................ 2022-072190

(51) Int. Cl.
*H04R 1/12* (2006.01)
*H04R 7/12* (2006.01)
*H04R 9/02* (2006.01)
*H04R 9/06* (2006.01)

(52) U.S. Cl.
CPC ............ *H04R 7/122* (2013.01); *H04R 9/025* (2013.01); *H04R 9/06* (2013.01)

(58) Field of Classification Search
CPC .......... H04R 7/122; H04R 9/025; H04R 9/06; H04R 31/003; H04R 2207/021; H04R 1/24
See application file for complete search history.

(56) References Cited

FOREIGN PATENT DOCUMENTS

JP 01-057885 4/1989

*Primary Examiner* — Tuan D Nguyen
(74) *Attorney, Agent, or Firm* — Greenblum & Bernstein, P.L.C.

(57) ABSTRACT

A sub cone for use in a loudspeaker includes a slanted portion that has an aperture area that increases toward an emission direction in which sound is emitted from the loudspeaker and a rim portion that is annular in shape and extends linearly outward from an edge of a distal end of the slanted portion in a direction orthogonal to the emission direction.

7 Claims, 3 Drawing Sheets

SUB CONE AND LOUDSPEAKER

CROSS REFERENCE TO RELATED APPLICATION

The present application is based on and claims priority of Japanese Patent Application No. 2022-072190 filed on Apr. 26, 2022.

FIELD

The present disclosure relates to a sub cone and a loudspeaker including the same.

BACKGROUND

Conventionally, there is a loudspeaker in which a sub cone is placed at the center of a cone such as that described in Patent Literature (PTL) 1.

CITATION LIST

Patent Literature

PTL 1: Japanese Unexamined Utility Model (Registration) Application Publication No. 1-057885

SUMMARY

However, the loudspeaker described in the above-mentioned PTL 1 can be improved upon.

The present disclosure provides an electroacoustic converter that can improve upon the above related art.

A sub cone according to an aspect of the present disclosure is a sub cone for use in a loudspeaker and includes a slanted portion that has an aperture area that increases toward an emission direction in which sound is emitted from the loudspeaker and a rim portion that is annular in shape and extends linearly outward from an edge of a distal end of the slanted portion in a direction orthogonal to the emission direction.

Furthermore, a loudspeaker according to an aspect of the present disclosure includes a main cone, a magnetic circuit, a frame that holds the magnetic circuit and the main cone, a voice coil body including one end portion coupled to the main cone and another end portion disposed in a magnetic gap of the magnetic circuit, and a sub cone that is disposed in front of the main cone in an emission direction in which sound is emitted from the loudspeaker. The sub cone includes a slanted portion that has an aperture area that increases toward the emission direction and a rim portion that is annular in shape and extends linearly outward from an edge of a distal end of the slanted portion in a direction intersecting the emission direction.

The present disclosure can improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Next, an embodiment of a sub cone and a loudspeaker according to the present disclosure will be described with reference to the drawings. It should be noted that the following embodiment is merely an example of a sub cone and a loudspeaker according to the present disclosure. Accordingly, the scope of the present disclosure is defined by the language in the Claims with reference to the following embodiment, and is not intended to be limited by the following embodiment alone. Therefore, among elements in the following embodiments, those not recited in any of the independent claims defining the broadest concept of the present disclosure are not necessarily required in order to achieve the object of the present disclosure, but are described as elements included in a preferred embodiment.

Moreover, the drawings are schematic illustrations which may include emphasis, omission, or adjustment of proportion as necessary for the purpose of illustrating the present disclosure, and thus the shapes, positional relationships, and proportions shown may be different from actuality.

Figure 1:
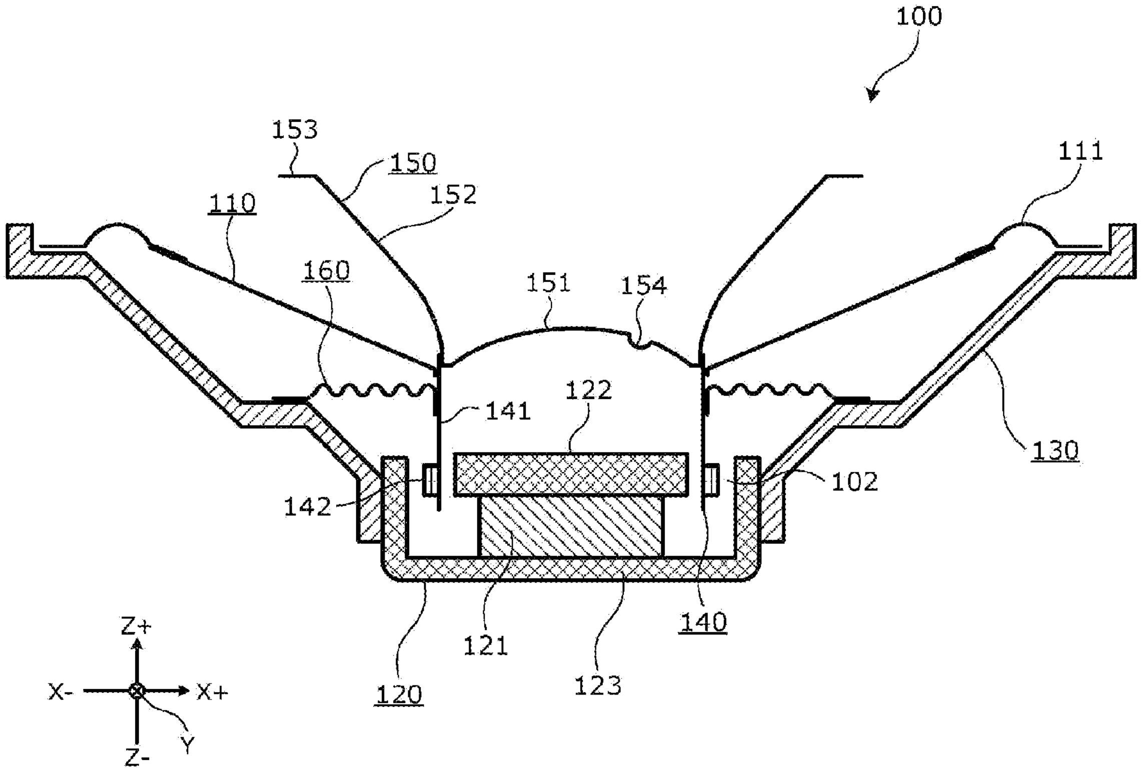
FIG. 1 is a cross-sectional view illustrating a cross section of a loudspeaker according to an embodiment of the present disclosure.
Figure 2:
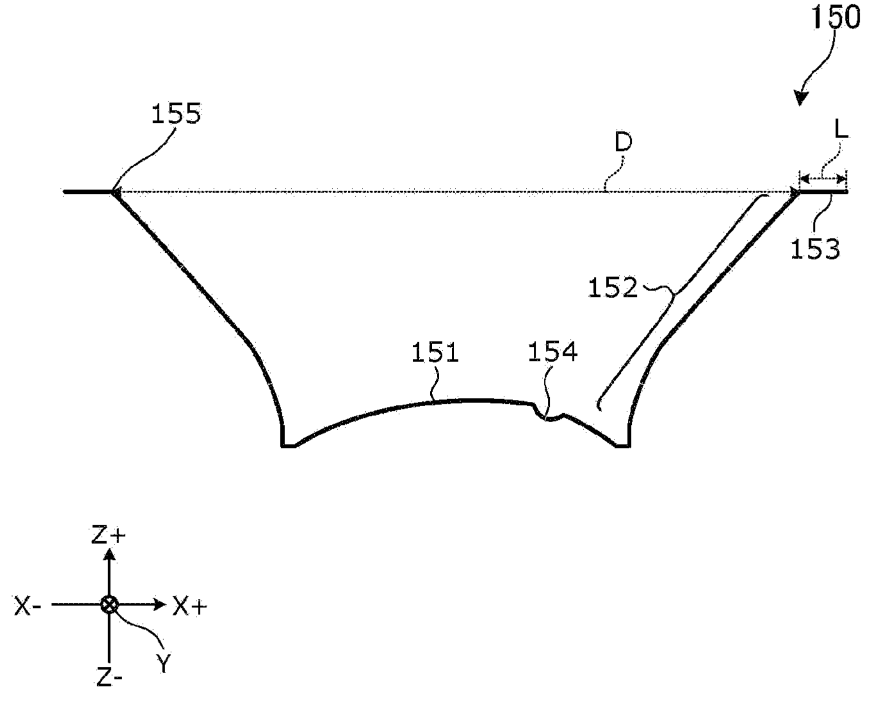
FIG. 2 is a cross-sectional view of a sub cone according to the embodiment of the present disclosure.
Figure 3:
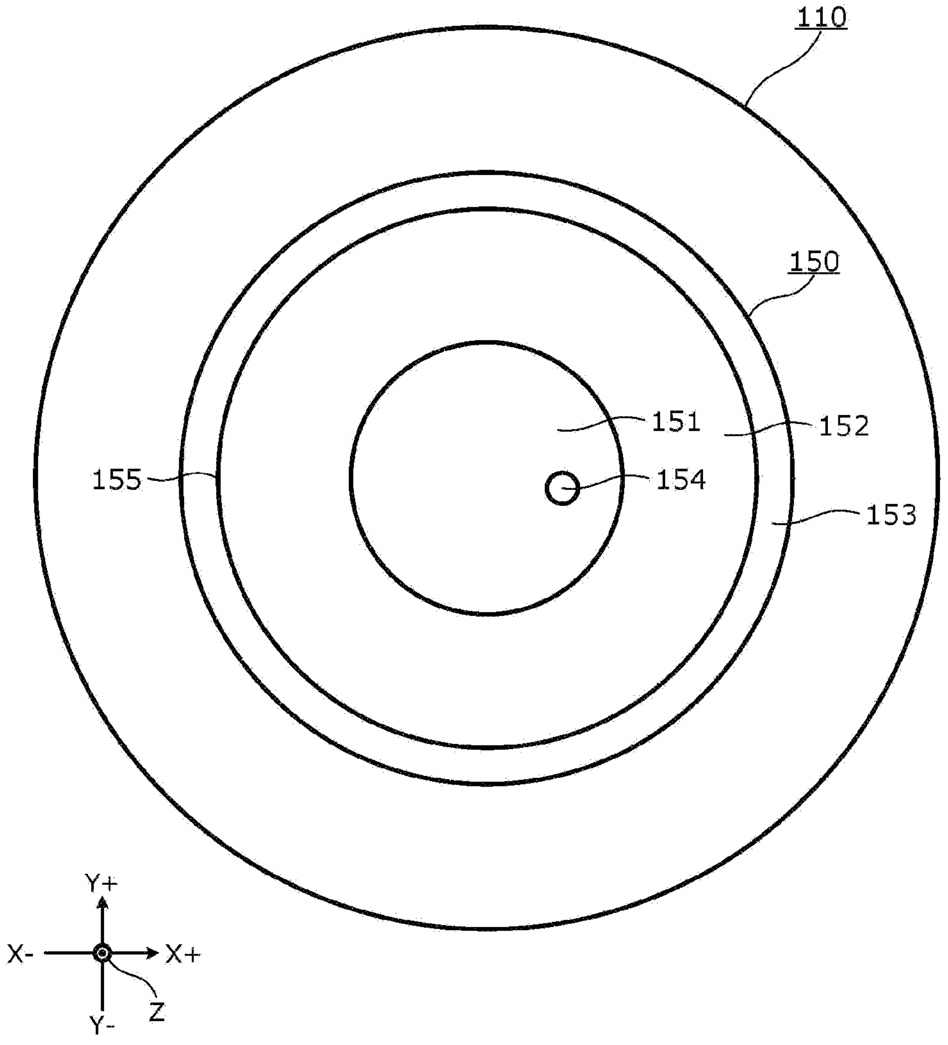
FIG. 3 is a plan view of a main cone and the sub cone according to the embodiment of the present disclosure.

FIG. 1 is a cross-sectional view illustrating a cross section of a loudspeaker according to an embodiment of the present disclosure. FIG. 2 is a cross-sectional view of a sub cone according to the embodiment of the present disclosure. FIG. 3 is a plan view of a main cone and the sub cone according to the embodiment of the present disclosure. Loudspeaker 100 is an electroacoustic converter that converts electrical signals that are input to sound, and includes main cone 110, magnetic circuit 120, frame 130, voice coil body 140, and sub cone 150. In the present embodiment, loudspeaker 100 includes damper 160.

Main cone 110 is a board-like or membrane-like component that generates sound by vibrating in conjunction with the reciprocating motion (Z-axis direction in the figure) of voice coil body 140. Although the shape of main cone 110 is not particularly limited, in the present embodiment, main cone 110 is of a truncated-cone shape, that is, a so-called cone shape. Main cone 110 is disposed so that its aperture diameter increases toward the direction of sound emission (Z+ direction in the figure). The end portion on the large-diameter side of main cone 110 is connected to frame 130 via edge 111, and the end portion on the small-diameter side is connected to the outer circumferential surface of voice coil body 140.

Magnetic circuit 120 includes cylindrical magnet 121 that is a magnetized permanent magnet, circular board-shaped plate 122 attached to the top of magnet 121, and a bottomed, cylindrical yoke 123 that houses magnet 121 and plate 122, and annular magnetic gap 102 is formed between plate 122 and yoke 123.

Frame 130 is a structural component that holds magnetic circuit 120 and main cone 110. Although the shape of frame 130 is not particularly limited, in the present embodiment, the overall appearance of frame 130 is funnel shaped. The outer circumferential rim of main cone 110 is placed in a position surrounded by the upper-end circumferential portion of frame 130, and frame 130 and main cone 110 are bonded to each other via annular edge 111.

Voice coil body 140 includes cylindrical bobbin 141 and coil 142 wound around the outer circumference of bobbin 141. Voice coil body 140 is disposed such that one end thereof is coupled to the central portion of main cone 110 and the other end thereof is inserted into magnetic gap 102 of magnetic circuit 120. Furthermore, voice coil body 140 is supported by damper 160 that connects frame 130 and voice coil body 140 in a bridge-like manner.

Sub cone 150 is a cone-shaped component that is disposed in the central portion of main cone 110 and is disposed in front of main cone 110 in the direction of sound emission (Z+ direction in the figure). Sub cone 150 is attached to the front end of voice coil body 140 in order to enhance the high-frequency response of loudspeaker 100. In the present embodiment, sub cone 150 includes sealing component 151 that seals voice coil body 140. Sealing component 151 is dome shaped and bulges out toward the direction of sound emission, and depressed portion 154 is provided in a portion of sealing component 151. Depressed portion 154 is caved inward in a dome shape toward the direction opposite to the direction of sound emission (Z− direction in the figure). Depressed portion 154 is provided so that sub cones 150 can be easily taken one at a time when they are stacked on top of each other during the manufacturing of loudspeaker 100. Sub cone 150 is connected to the inner circumferential surface of the front end of voice coil body 140 using adhesives, or the like.

As shown in FIG. 2, sub cone 150 includes slanted portion 152 that has an aperture area that increases toward the direction of sound emission of loudspeaker 100 (Z+ direction in the figure), and annular rim portion 153 that extends linearly outward from an edge of the distal end of slanted portion 152, in directions (within an XY plane in the figure) that are orthogonal to the direction of sound emission. “Extends linearly” refers to a state where the cross section of rim portion 153 is in a straight line when sub cone 150 is cut along a plane that includes the direction of sound emission. By providing sub cone 150 with rim portion 153 that spreads out as a flat surface, the structural rigidity of sub cone 150 can be enhanced, and the overall weight of sub cone 150 can be reduced. With this, the small-amplitude vibrations of sub cone 150 can be increased, thereby making it possible to inhibit a tendency seen in loudspeakers that include a conventional sub cone in which response characteristics gradually deteriorate before reaching 20 kHz in the audible range of sound. That is to say, sub cone 150 can be used to enhance the high-frequency response of loudspeaker 100.

Sealing component 151, slanted portion 152, and rim portion 153 of sub cone 150 are formed as a single unit. Bent portion 155 is formed between slanted portion 152 and rim portion 153 of sub cone 150. Bent portion 155 is bent to such a degree that a clearly recognizable ridge line is formed between slanted portion 152 and rim portion 153 of sub cone 150. Rim portion 153, which is provided beyond bent portion 155, is annular in shape with a flat or nearly flat surface. In the direction of sound emission, which is centered on the winding axis of coil 142, length L from bent portion 155 to the distal end of rim portion 153 is preferably within a range of 1 mm to 8 mm or 1% to 20% of maximum aperture diameter D of slanted portion 152. When length L of rim portion 153 is less than 1 mm or less than 1% of maximum aperture diameter D, it will not be possible to effectively enhance the structural rigidity of sub cone 150, and enhancement of the high-end frequency response of loudspeaker 100 cannot be expected. Furthermore, when length L of rim portion 153 is larger than 8 mm or larger than 20% of maximum aperture diameter D, the weight of sub cone 150 will increase, thereby causing unneeded sympathetic resonance to occur that could negatively impact the frequency response of loudspeaker 100.

Rim portion 153 may have a higher density than slanted portion 152. By providing a rim portion 153 with a higher density than other portions, the rigidity of rim portion 153 can be increased, thereby making it possible to enhance the overall structural rigidity of sub cone 150 without significantly increasing the weight of sub cone 150. Although the methods used to increase the density of rim portion 153 are not particularly limited, rim portion 153 may be given a higher density by decreasing its thickness by compressing it with more force than other portions, such as slanted portion 152. Furthermore, when sub cone 150 is composed of paper, sub cone 150 may be given a higher density and/or enhanced strength through impregnation or application of a curing agent to rim portion 153.

The shape of slanted portion 152 is not particularly limited, and a truncated-cone shape with an aperture area that is larger with distance from main cone 110 may be used. In the present embodiment, slanted portion 152 is curved to bulge inward, and in the direction of sound emission, the radius of curvature of the distal end of slanted portion 152 is longer than the radius of curvature of the base end of slanted portion 152. That is to say, slanted portion 152 curves with multiple degrees of curvature. Specifically, the radius of curvature of the distal end of slanted portion 152 is at least 10 times the curvature radius of the base end of slanted portion 152.

The materials that main cone 110 and sub cone 150 are composed of are not particularly limited, and examples of materials include paper, resin, and metal, and so on. Furthermore, the materials that main cone 110 and sub cone 150 are composed of may be the same or they may be different from each other.

Figure 4:
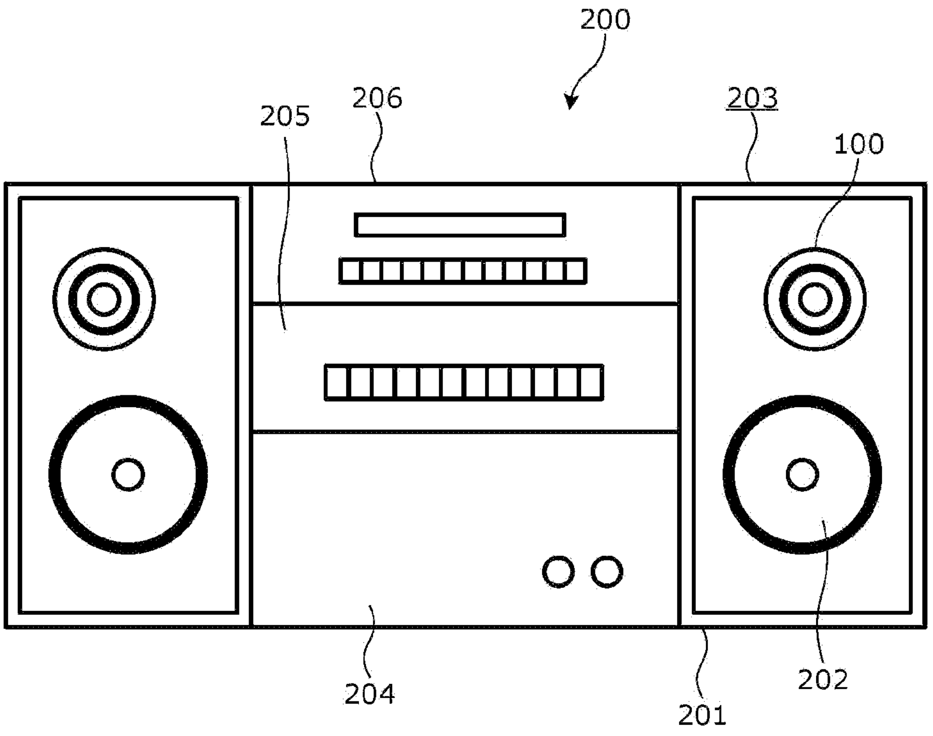
FIG. 4 is a diagram illustrating the external appearance of an electronic device that includes the loudspeaker according to the embodiment.

Next, Application Example 1 of loudspeaker 100 will be described. FIG. 4 is a diagram illustrating the external appearance of an electronic device that is Application Example 1 of the loudspeaker. An audio mini-component system will be described as an example of electronic device 200 that includes loudspeaker 100.

Electronic device 200 includes, on the left and right, loudspeaker systems 203 each composed of loudspeaker 100 and subwoofer 202, which are housed in enclosure 201.

Furthermore, electronic device 200 includes amplifier 204 that includes an amplifying circuit for electrical signals input to loudspeaker systems 203, and tuner 205 and CD player 206 that output a source to be input to amplifier 204.

In electronic device 200, which is an audio mini-component system, audio signals, or the like, input from tuner 205 and CD player 206 are amplified by amplifier 204, and sound is emitted from loudspeakers 100 and subwoofers 202 provided in loudspeaker systems 203. Specifically, in loudspeaker 100, the interaction between the dynamic magnetic force generated by the electrical signal input to voice coil body 140 and the static magnetic force generated in magnetic gap 102 of magnetic circuit 120 causes voice coil body 140 to vibrate in relation to frame 130. This vibration is transmitted and causes main cone 110 and sub cone 150 to vibrate and thereby generate sound.

As described earlier, with this configuration it is possible to realize electronic device 200, which can maintain favorable audio quality, and in particular, superior characteristics for high-end frequencies that was not conventionally possible.

While an audio mini-component system was described as an application example of loudspeaker 100 to electronic device 200, applications are not limited to such an example. For example, loudspeaker 100 can be applied for use in audio systems in automobiles and in portable audio devices, and the like. Furthermore, loudspeaker 100 can be widely applied and deployed for use in video equipment, such as liquid crystal display (LCD) televisions and organic electroluminescence (EL) display televisions, and the like, information communication devices, such as mobile phones, and the like, and electronic devices, such as computer related devices, and the like.

Figure 5:
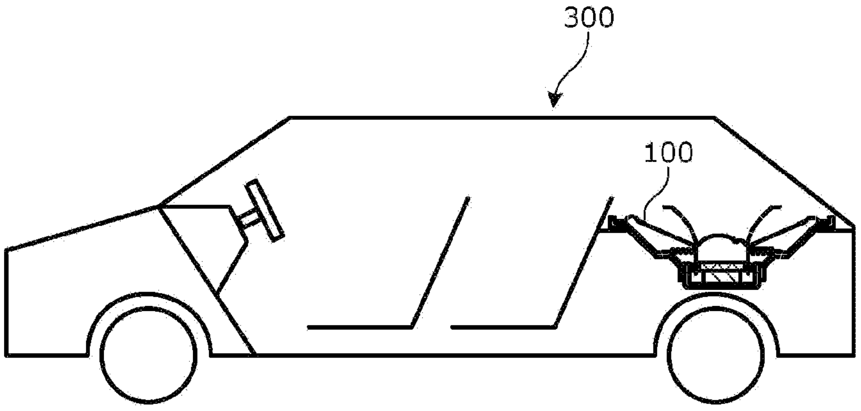
FIG. 5 is a cross-sectional view of a mobile body that includes the loudspeaker according to the embodiment.

Next, Application Example 2 of loudspeaker 100 will be described. FIG. 5 is a cross-sectional view illustrating a mobile body that is Application Example 2 of the loudspeaker. In the case of the present embodiment, an automobile is described as an example of mobile body 300.

As illustrated in this figure, loudspeaker 100 that includes sub cone 150 according to the present disclosure is provided in the rear tray or front panel of mobile body 300. Loudspeaker 100 emits sound inside of the mobile body based on audio signals that are transmitted from a car navigation or car audio unit that is separately provided in the mobile body.

In this manner, of the overall range of frequency response of loudspeaker 100, sub cone 150 of loudspeaker 100 provided in mobile body 300 can enhance high-end frequency response, thus achieving superior performance.

Since sub cone 150, as described above, includes annular rim portion 153 that spreads out as a flat surface, the problem faced by loudspeakers that include a conventional sub cone, in which high-frequency response gradually deteriorates before reaching the upper limits of the audible range of sound, can be solved. At the same time, the structural rigidity of sub cone 150 can be enhanced while limiting increases in the weight of sub cone 150. This effect is more pronounced in a sub cone 150 composed of paper, which has lower structural strength when compared to a metal sub cone 150, which has relatively high structural strength. Furthermore, loudspeaker 100 that includes sub cone 150 can inhibit the tendency of a gradual deterioration in high-frequency response before the physical quantity of the high-frequency limit frequency of 20 kHz is reached, thereby improving high-frequency response.

It should be noted that the present disclosure is not limited to the above embodiment. For example, other embodiments produced by arbitrarily combining or omitting some elements described in the Specification may be included as embodiments of the present disclosure. Moreover, so long as they do not depart from the essence of the present disclosure, that is to say, so long as they do not depart from the intended meaning of the appended claims, variations conceivable by those skilled in the art resulting from modifying the above embodiment are included in the present disclosure.

For example, the shape of main cone 110 is not particularly limited. Main cone 110 may be in the shape of a circular cone as described in the present embodiment, or may be of a three-dimensional shape, such as an elliptical cone, or the like. Furthermore, main cone 110 may be of a three-dimensional shape, or may be of a two-dimensional shape, such as a round-tabular shape or a rectangular-tabular shape, or the like.

Furthermore, loudspeaker 100 is not limited to an internal-magnet type magnetic circuit 120, and loudspeaker 100 may include an external-magnet type magnetic circuit. Additionally, loudspeaker 100 need not include damper 160.

Moreover, voice coil body 140 need not include a bobbin and may include coil 142.

FURTHER INFORMATION ABOUT TECHNICAL BACKGROUND TO THIS APPLICATION

The disclosure of the following patent application including specification, drawings, and claims are incorporated herein by reference in its entirety: Japanese Patent Application No. 2022-072190 filed on Apr. 26, 2022.

INDUSTRIAL APPLICABILITY

The sub cone and the loudspeaker including the sub cone according to the present disclosure are applicable to electronic devices, such as audio-visual devices and information communication devices, and the like, and mobile bodies, such as automobiles, and the like.

The invention claimed is:

1. A sub cone for use in a loudspeaker, the sub cone comprising:
- a slanted portion that has an aperture area that increases toward an emission direction in which sound is emitted from the loudspeaker; and
- a rim portion that is annular in shape and extends linearly outward from an edge of a distal end of the slanted portion, in a direction orthogonal to the emission direction.

2. The sub cone according to claim 1, wherein
- the slanted portion and the rim portion form a bend at a bent portion, and a length of the rim portion from the bent portion to a distal end of the rim portion is within a range of from 1 mm to 8 mm or from 1 percent to 20 percent of a maximum aperture diameter of the slanted portion.

3. The sub cone according to claim 1, wherein
- the rim portion has a density higher than a density of the slanted portion.

4. The sub cone according to claim 3, wherein
- the rim portion has a thickness less than a thickness of the slanted portion.

5. The sub cone according to claim 3, wherein
- a curing agent is applied to the rim portion.

6. The sub cone according to claim 1, wherein
- in the emission direction, a radius of curvature of the distal end of the slanted portion is longer than a radius of curvature of a base end of the slanted portion.

7. A loudspeaker comprising:
- a main cone;
- a magnetic circuit;
- a frame that holds the magnetic circuit and the main cone;
- a voice coil body including one end portion coupled to the main cone and an other end portion disposed in a magnetic gap of the magnetic circuit; and
- a sub cone that is disposed in front of the main cone, in an emission direction in which sound is emitted from the loudspeaker, wherein
  - the sub cone includes:
    - a slanted portion that has an aperture area that increases toward the emission direction; and a rim portion that is annular in shape and extends linearly outward from an edge of a distal end of the slanted portion, in a direction intersecting the emission direction.

* * * * *